US008092622B1

(12) United States Patent
Clausen et al.

(10) Patent No.: US 8,092,622 B1
(45) Date of Patent: Jan. 10, 2012

(54) DEGRADATION OF TATP, TNT, AND RDX USING MECHANICALLY ALLOYED METALS

(75) Inventors: Christian Clausen, Chuluota, FL (US);
Cherie Geiger, Geneva, FL (US);
Michael Sigman, Oviedo, FL (US);
Rebecca Fidler, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 181 days.

(21) Appl. No.: 12/478,413

(22) Filed: Jun. 4, 2009

Related U.S. Application Data

(63) Continuation-in-part of application No. 11/732,402, filed on Apr. 3, 2007.

(60) Provisional application No. 61/059,519, filed on Jun. 6, 2008, provisional application No. 60/789,519, filed on Apr. 5, 2006.

(51) Int. Cl.
*C06B 45/00* (2006.01)
*C06B 45/02* (2006.01)
*D03D 23/00* (2006.01)
*D03D 43/00* (2006.01)

(52) U.S. Cl. ........ 149/2; 149/21; 149/108.2; 149/108.8; 149/109.6

(58) Field of Classification Search ................ 149/2, 21, 149/108.2, 108.8, 109.6
See application file for complete search history.

(56) References Cited

U.S. PATENT DOCUMENTS

| 4,641,566 | A | * | 2/1987 | Pomeroy ................ 89/1.13 |
| 4,908,323 | A | * | 3/1990 | Werner ................ 436/135 |
| 5,003,109 | A | * | 3/1991 | Costantini ............ 568/385 |
| 5,434,336 | A | * | 7/1995 | Adams et al. .......... 588/313 |
| 6,664,298 | B1 | * | 12/2003 | Reinhart et al. ........ 516/22 |
| 6,767,717 | B1 | | 7/2004 | Itshaky et al. |
| 6,773,674 | B2 | | 8/2004 | Bannister et al. |
| 7,077,044 | B2 | | 7/2006 | Badger et al. |
| 7,159,463 | B2 | | 1/2007 | Dayagi et al. |

FOREIGN PATENT DOCUMENTS

WO    WO9943846    2/1999

OTHER PUBLICATIONS

Ahmad, F., Schnitker, S., Newell, C., Remediation of RDX- and HMX-contaminated Groundwater Using Organic Mulch Permeable Reactive Barriers, Journal of Contaminant Hydrology, 2007, pp. 1-20, vol. 90.

(Continued)

*Primary Examiner* — James McDonough
(74) *Attorney, Agent, or Firm* — Brian S. Steinberger; Joyce P. Morlin; Law Offices of Brian S. Steinberger, P.A.

(57) ABSTRACT

Bimetallic alloys prepared in a ball milling process, such as iron nickel (FeNi), iron palladium (FePd), and magnesium palladium (MgPd) provide in situ catalyst system for remediating and degrading nitro explosive compounds. Specifically, munitions, such as, 2,4,6-trinitrotoluene (TNT), cyclo-1,3,5-trimethylene-2,4,6-trinitramine (RDX), nitrocellulose and nitroglycerine that have become contaminants in groundwater, soil, and other structures are treated on site to remediate explosive contamination.

9 Claims, 7 Drawing Sheets

OTHER PUBLICATIONS

Aitken, B., Geiger, C., Clausen, C., Quinn, J., Variables Associated with Mechanical Alloying of Bimetals for PCB Remediation, Proceedings of the International Conference on Remediation of Chlorinated and Recalcitrant Compounds, 2006.

Bandstra, J., Miehr, R., Johnson, R., Tratnyek, P., Reduction of 2, 4, 6-Trinitrotoluene by Iron Metal: Kinetic Controls on Product Distributions in Batch Experiments, Environmental Science and Technology, 2005, pp. 230-238, vol. 39.

Bellamy, A., Triacetone Triperoxide: Its Chemical Destruction, Journal of Forensic Sciences, 1999, pp. 603-608, vol. 44, No. 3.

Best, E., Sprecher, S., Larson, S., Frederickson, H., Bader, D., Environmental Behavior of Explosives in Groundwater from the Milan Army Ammunition Plant in Aquatic and Wetland Plant Treatments, Removal, Mass Balances and Fate in Groundwater of TNT and RDX, Chemosphere, 1999, pp. 3383-3396, vol. 38, No. 14.

Block, L., Devising a New Counter-Terrorism Strategy in Europe, Terrorism Monitor, 2006, vol. 4, No. 21.

Brooks, K., Quinn, J., Clausen, C., Geiger, C., Aitken, B., Devor, R., A Novel Method for Remediation of PCBs in Weathered Coatings, Proceedings of the International Conference on Remediation of Chlorinated and Recalcitrant Compounds, 2006.

Cannon, J., [online] OU Bombing Accidental, Experts Say, The Oklahoman, 2 pages, [retrieved on Mar. 11, 2006] Retrieved from: http://newsok.com|print.php?article=1774773.

Clark, B., Boopathy, R., Evaluation of Bioremediation Methods for the Treatment of Soil Contaminated with Explosives in Louisiana Army Ammunition Plant, Minden, Louisiana, Journal of Hazardous Materials, 2007, pp. 643-648, vol. 143.

Cwiertny, D., Bransfield, S., Livi, K., Fairbrother, D., Roberts, A., Exploring the Influence of Granular Iron Additives on 1, 1, 1-Trichloroethane Reduction, Environmental Science and Technology, 2006, pp. 6837-6843, vol. 40, No. 21.

Dillert, R., Brandt, M., Fornefett, I., Siebers, U., Bahnemann, D., Photocatalytic Degradation of Trinitrotoluene and Other Nitroarmoatic Compounds, Chemosphere, 1995. pp. 2333-2341, vol. 30, No. 12.

Fuller, M., Schaefer, C., Lowey, J., Degradation of Explosives-Related Compounds Using Nickel Catalysts, Chemosphere, 2007, pp. 419-427, vol. 67.

Hannink, N., Rosser, S., Bruce, N., Phytoremediation of Explosives, Critical Reviews in Plant Sciences, 2002, pp. 511-538, vol. 21, No. 5.

Jung, C., Newcombe, D., Crawford, D., Crawford, R., Detection and Decontamination of Residual Energetics from Ordnance and Explosives Scrap, Biodegradation, 2004, pp. 41-48, col. 15.

Kim, D., Strathmann, T., Role of Organically Comlexed Iron(II) Species in the Reductive Transformation of RDX in Anoxic Environment, Environmental Science & Technology, 2007, pp. 1257-1264, vol. 41.

Kulkarni, M., Chaudhari, A., Microbial Remediation of Nitro-Aromatic Compounds: An Overview, Journal of Environmental Management, 2007, pp. 496-512, vol. 85.

Lachance, B., Robidoux, P., Hawari, J., Ampleman, G., Thiboutot, S., Sunahara, G., Cytotoxic and Genotoxic Effects of Energetic Compounds on Bacterial and Mammalian cells In Vitro, Mutation Research, 1999, pp. 25-39, vol. 44.

McHugh, C., Smith, W:, Lacey, R., Graham, D., The First Controlled Reduction of the High Explosive RDX, Chem. Comm., 2002, pp. 2514-2515.

Milas, N., Golubovic, A., Studies in Organic Peroxides, XXIV. Preparation, Separation and Identification of Peroxides Derived from Diethyl Ketone and Hydrogen Peroxide, Dept. of Chemistry, Massachusetts Institute of Technology, 1958, pp. 3361-3364, vol. 81.

Mu, Y., Yu, H., Zheng, J., Zhang, S., Sheng, G., Reductive Degradation of Nitrobenzene in Aqueous Solution by Zero-Valent Iron, Chemosphere, 2004, pp. 789-794, vol. 54.

Oh, S., Cha, D., Chiu, P., Kim, B., Zero-Valent Iron Treatment of RDX-Containing and Perchlorate-Containing Wastewaters from an Ammunition-Manufacturing Plant at Elevated Temperatures, Water Science and Technology, 2006, pp. 47-53, vol. 54, No. 10.

Oxley, J., Smith, J., Chen, H., Decomposition of a Multi-Peroxidic Compound: Triacetone Triperoxide (TATP), Propellants, Explosives, Pyrotechnics, 2002, pp. 209-216, vol. 27.

Patel, U., Suresh, S., Dechlorination of Chlorophenols Using Magnesium-Palladium Bimetallic System, Journal of Hazardous Materials, 2007, pp. 431-438, vol. 147.

Pennington, J., Brannon, J., Environmental Fate of Explosives, Thermochimica Acta, 2002, pp. 163-172, vol. 384.

Pennington, J., et al., Distribution and Fate of Energetics on DoD Test and Training Ranges: Interim Report 5, Strategic Environmental Research and Development Program, 2005.

Quinn, J., et al., Field Demonstration of DNAPL Dehalogenation Using Emulsified Zero-Valent Iron, Environmental Science and Technology, 2005, pp. 1309-1318, vol. 39.

Snellinx, Z., Nepovim, A., Taghavi, S., Vangronsveld, J., Vanek, T., Lelie, D., Biological Remediation of Explosives and Related Nitroaromatic Compounds, Environmental Science and Pollut Res, 2002, pp. 48-61, vol. 9, No. 1.

Son, H., Lee, S., Cho, I., Zoh, K., Kinetics and Mechanism of TNT Degradation in TiO2 Photocatalysis, Chemosphere, 2004, pp. 309-317, vol. 57.

USEPA (U.S. Environmental Protection Agencent) Document, Office of Drinking Water, Washington, D.C., 1988, [online] Retrieved from http://www.epa.gov/iris/subst/0629.htm.

USEPA, Innovative Uses of Compost: Composing of Soils Contaminated by Explosives, Solid Waste and Emergency Response, 1997.

* cited by examiner

DEGRADATION OF TATP, TNT, AND RDX USING MECHANICALLY ALLOYED METALS

This invention claims the benefit of priority based on the U.S. Provisional Patent Application Ser. No. 61/059,519 filed Jun. 6, 2008 and is a continuation-in-part of U.S. patent application Ser. No. 11/732,402 filed Apr. 3, 2007 which claims the benefit of priority based on U.S. Provisional Patent Application Ser. No. 60/789,519 filed Apr. 5, 2006, collectively, the foregoing applications are incorporated herein by reference.

STATEMENT REGARDING FEDERALLY SPONSORED RESEARCH OR DEVELOPMENT

The subject invention was made with government support under National Aeronautics and Space Administration (NASA) Kennedy Space Center Contract number NAG10312. The U.S. government has certain rights in this invention.

FIELD OF THE INVENTION

This invention relates to the degradation of explosive materials and, in particular, to the use of metal alloys and a method of making and using the metal alloys for the degradation of the nitro and peroxide explosives.

BACKGROUND AND PRIOR ART

The potential environmental and health problems of the explosives 2,4,6-trinitrotoluene (TNT) and cyclo-1,3,5-trimethylene-2,4,6-trinitramine (RDX) has increased the progress of technologies that remediate contaminated groundwater, soil, and structures. Areas contaminated from nitro explosives, such as TNT and RDX, are caused by the incomplete detonation of nitro explosives in munitions areas as well waste streams from industrial production areas. These sources of contamination have brought about the dispersal of TNT and RDX in soil and groundwater as well as the remains of explosive residue on structures according to J. C. Pennington, et al in *Thermochimica Acta* 384, 163-172, and reported by Pennington et al. in U.S. Army Corps of Engineers, Engineer Research and Development Center Report # ERDC TR-05-2, *Distribution and Fate of Energetics on DoD Test and Training Ranges: Interim Report* 5, April 2005.

The toxicity and mutagenicity of RDX and TNT according to G. T. Peters et al in *Environ. Toxicol. Chem.* 10, 1073-1081 (1991) and B. Lachance et al in *Mutation Research* 444, 25-39, (1999) have led to regulation and legislation by the EPA to advance remediation technologies and maintain and protect the environment from present and future contamination of TNT and RDX in the environment as discussed in U.S. Environmental Protection Agency, *Office of Drinking Water*, Washington, D.C. (1988) and U.S. Environmental Protection Agency, *Solid Waste and Emergency Response* (5306W) EPA530-F-97-045 (1997).

Remediation research includes the remediation of nitro explosive contamination on scrap metal and ordnance according to C. M. Jung et al. in *Biodegradation* 15, 41-8 (2004), while the majority of the work centers on removal of explosives from contaminated soil as discussed by F. Ahmad et al. in *J. of Contaminant Hydrology* 90, 1-20 (2007) and groundwater contamination as discussed by E. P. H. Best et al. in *Chemosphere* 38, 3383-96 (1999) and S. Y. Oh et al. in *Water Sci. & Technol.* 54, 47-53 (2006).

Current research has employed phytoremediation as discussed by N. K. Hannink et al., in *Critical Reviews in Plant Sciences* 21, 511-538 (2002) and microbial techniques disclosed by M. Kulkarni et al in *J. of Environ. Management* 85, 492-512 (2007) and B. Clark et al in *J. of Haz. Mat.* 143, 643-648 (2007). These biological remediation technologies are inexpensive and require low energy use in comparison to other remediation methods, however, these techniques have limitations which include slower kinetic rates as confirmed by Kulkarni et al in *J. of Environ. Management* 83, (2007) supra and the suitability for degrading lower level nitro explosive contamination as discussed by Z. Snellinx, et al in *Environ. Set. Polka. Res.* 9, 48-61 (2002).

Other research has focused on the use of metals to degrade nitro explosives. Some of the metals previously investigated include the use of complexed iron according to D. Kim et al in *Environ. Sci. Technol.* 41, 1257-1264 (2007) and zero-valent iron (ZVI) discussed by J. Z. Bandstra et al in *Environ. Sci. Technol.* 39, 230-238 (2005) and S. Y. Oh et al. *Water Sci. & Technol.* 54, (2006) supra, $TiO_2$ palladium photocatalysis are disclosed by H.-S. Son et al. in *Chemosphere* 57, 309-317 (2004) and R. Dillert et al. in *Chemosphere* 30, 2333-2341 (1995), and nickel discussed by M. E. Fuller et al in *Chemosphere* 67, 419-427 (2007). The use of ZVI is typically restricted to anaerobic conditions, limited pH ranges as reported by Y. Mu et al. in *Chemosphere* 54, 789-794 (2004), and degradation rates can be constrained by surface corrosion. The use of ZVI in anaerobic conditions results in the production of 2,4,6-triaminotoluene (TAT), which is considered more hazardous than the parent TNT contamination according to Bandstra et al. in *Environ. Sci. Technol.* 39 (2005) supra.

Commonly known hydrogenation and reduction catalysts include palladium (Pd) and nickel (Ni), and these catalysts have been investigated for the successful remediation of these nitro explosives under ambient temperatures, pressures, and pH conditions. These remediation techniques, however, may require hydrogen sources and reaction vessels purged with hydrogen gas according to Fuller et al. in *Chemosphere* 67, (2007) supra and C. J. McHugh et al. in *Chem. Commun.* 2514-2515 (2002). The reaction conditions for these remediation techniques would make them less appropriate for in situ treatment of nitro explosive contamination.

The transition metals, Pd and Ni, are overall less susceptible to surface corrosion, which is advantageous over the use of only ZVI. Combining transition metal catalysts with ZVI has been successfully reported to reduce chlorinated compounds according to D. M. Cwiertny et al. in *Environ. Sci. Technol.* 40, 6837-6843 (2006). The degradation mechanics of TNT and RDX by mechanically alloying Fe with Pd and Ni is explored in the present invention.

Magnesium was chosen as a potential substrate in addition to ZVI. Magnesium is thermodynamically favored over the extensively used ZVI as a reductive metal because Mg has a greater reduction potential as that compared to ZVI:

$$Mg^{2+} + 2e^- \rightarrow Mg^0 \quad E^0 = -2.37V$$

$$Fe^{2+} + 2e^- \rightarrow Fe^0 \quad E^0 = -0.44V$$

Magnesium also has a self-limiting oxide layer unlike the easily corroded ZVI. Magnesium combined with the hydrogenation catalyst palladium has been explored as a reductive catalytic system and has been shown to reduce chlorinated aromatics as disclosed by E. Hadnagy et al. in *J. of Environ.*

Sci. and Health Part A 42, 685-695 (2007) and U. D. Patel et al in *J. of Hazardous Mat.* 147, 431-438 (2007) thus the use of magnesium-palladium alloy (MgPd) as a reductive catalytic system for nitroaromatics and other nitro explosives shows potential.

Triacetone triperoxide (TATP) is a cyclic peroxide explosive that is easily prepared using commonly found materials: hydrogen peroxide, acetone, and an acid catalyst as discussed by N. A. Milas et al in *J. Am. Chem. Soc.* 82, 3361-3364 (1959). TATP has become more frequently used by terrorists according to L. Block in *Terrorism Monitor* 4, 1-2 (2006), as well as used by clandestine chemists according to J. G. Cannon in *The Oklahoman* (Mar. 1, 2006) due to its ease in synthesis.

TATP has higher vapor pressure than many explosives and is especially sensitive to heat or friction, making it inappropriate for industrial production, therefore, TATP is not regarded as an environmental contaminant. However, TATP contamination can be found in underground production labs as well as targets of terrorist attacks. These contaminated areas pose a threat to both the public as well as the law enforcement personnel. The sensitivity of TATP makes the safe clean up of TATP a challenging problem resulting in the need for a secure and quick in situ destruction and clean-up method.

Currently, TATP destruction is restricted to reacting TATP with copper at a low pH as claimed by M. Costantini in U.S. Pat. No. 5,003,109 or refluxing in toluene with $SnCl_2$ as disclosed by J. A. Bellamy in *J. Forensic Sci.* 44, 603-608 (1999), and thermal decomposition as reported by J. C. Oxley et al in *Propellants, Explosives, Pyrotechnics* 27, 209-216 (2002). Although the methods degrade TATP to produce non-explosive byproducts, these methods are not in situ techniques and thus require disturbing the TATP contamination. MgPd has been investigated, in the present invention, as a reductive catalytic system that can cleave to the TATP ring and produce non-explosive byproducts.

A technology that can aid in the in situ treatment of TATP contaminated areas is disclosed that uses MgPd with emulsified zero valent metal (EZVM) technology. The outer oil membrane of the EZVM absorbs TATP crystals, which can be degraded by MgPd within the inner aqueous layer. This EZVM technology would permit the treatment of both wet and dry TATP contamination.

The following US Patents are related to degradation or removal of deleterious materials, including explosives.

U.S. Pat. No. 4,641,566 to Pomeroy teaches an in situ method for detecting buried land mines by non-destructive means involving the spraying of a suspected area with a leach of ionized metal and leaching the ionized metal into the soil to leave a metallic concentrate on an impervious object, such as a plastic mine; then, scanning the area with a metal detector.

U.S. Pat. No. 4,908,323 to Werner discloses a method for determining organic peroxides in aqueous and organic solutions using a peroxide detecting amount of a titanium (IV) compound.

U.S. Pat. No. 5,434,336 to Adams et al. describes an in situ process for the destruction of explosives by heating in the presence of elemental sulfur at temperatures below their spontaneous decomposition temperatures.

U.S. Pat. No. 6,664,298 to Reinhart et al. describes the in situ use of a zero-valent metal emulsion to dehalogenate solvents, such as, trichloroethylene (TCE) and other halogentated hydrocarbons that contaminate ground water and soil environments. The preferred zero-valent metal particles are nanoscale and microscale iron particles.

U.S. Pat. No. 6,767,717 to Itzhaky et al. describes a method of detecting a peroxide-based explosive in a sample suspected of having such an explosive; the method includes dissolving the sample in an organic solvent, then contacting the solution with an aqueous solution of a strong acid capable of decomposing the explosive to release hydrogen peroxide, and further contacting the mixture with a peroxidase enzyme to produce a pronounced change in the color of the substrate or its color intensity.

U.S. Pat. No. 6,773,674 to Bannister et al. describes methods and systems for detecting the presence of an energetic material, such as triacetone triperoxide (TATP), in a sample which is known to have the energetic material using thermal analysis for detecting and identifying explosives and other controlled substances. This method requires moving the explosive materials to a laboratory with appropriate analytical equipment.

U.S. Pat. No. 7,077,044 to Badger et al. discloses a method for bioremediating undetonated explosive devices by mixing an explosive mixture with microorganisms.

U.S. Pat. No. 7,159,463 to Dayagi et al. discloses a sensitive and selective method and device for the detection of trace amounts of a substance. A piezoelectric crystal element is used in a sensor device for identifying at least one foreign material from the environment.

WO1999/043846 to Keinan et al. discloses a method and kit for the detection of explosives. The method relies on the decomposition of TATP in the presence of concentrated aqueous sulfuric acid to produce hydrogen peroxide, which is detected by horseradish peroxidase and a color-change reagent.

J. A. Bellamy in *J. Forensic Science* 1999, 44(3), 603-608 reports that solutions of TATP in acetone and other organic solvents have been known to detonate, although solutions in toluene appear to be somewhat stable. It is therefore a risky proposition to dissolve the explosive in organic solvent in an attempt to remove it if no remediaton step is involved.

Irradiation with UV light has been used as a method of decomposing TATP in a detection scheme involving horseradish peroxidase/indicator combination as reported by R. Shulte-Ladbeck, et al. in "Trace Analysis of Peroxide-Based Explosives" *Analytical Chemistry* 2003, 75, 731-735.

The thermal decomposition of TATP has been found to have an activation energy which is within the reasonable expectation for a unimolecular decomposition initiated by a peroxide bond homolysis according to J. C. Oxley et al. in "Decomposition of a Multi-Peroxidic Compound Triacetone Triperoxide (TATP)" *Propellants, Explosives, Pyrotechnics,* 2002, 27, 209-216. Thermal decomposition of TATP in refluxing toluene has been found to be a slow process as reported by N. A. Milas et al. in "Studies in Organic Peroxides XXIV. Preparation, Separation and Identification of Peroxides Derived from Diethyl Ketone and Hydrogen Peroxide."*J. Am. Chem. Soc.* 1959, 82, 3361-3364.

The complexation of TATP with ions was investigated by F. Dubnikova, et al. and many ions are calculated to form stable complexes with the explosive, as reported in "Novel Approach to the Detection of Triacetone Triperoxide (TATP): Its Structure and Its Complexes with Ions" *J. Phys. Chem. A* 2002, 106, 4951-4956.

Further research is available on the use of nano-size elemental metal particles, such as, iron in emulsion systems capable of degrading chlorinated hydrocarbons in a controlled manner, the use of nanometal particles in emulsion systems where the reductive reactions take place within an emulsion droplet and where the hydrophilic and hydrophobic properties of the skin of the droplet can be controlled to a level so as to facilitate the entrance of the molecule of choice that is to be degraded. See C. L. Geiger, et al. "Nanoscale and Microscale Iron Emulsions for Treating DNAPL." in: *Innovative Strategies for the Remediation of Chlorinated Solvents and DNAPL in the Subsurface*. Series 837, 2002, ACS Books, Washington D.C. Jacqueline Quinn, et al. "Evaluating The Distribution Of Emulsified Zero-Valent Iron For Four Different Injection Techniques," *Remediation of Chlorinated and Recalcitrant Compounds* 2004, May 2004. Battelle Press, ISBN # 1-57477-132-9. Jacqueline Quinn, et al. "Field Demonstration of DNAPL Dehalogenation Using Emulsified Zero-Valent Iron," 2005, *Environ. Sci. Technol.* 2005; 39(5); 1309-1318.

Kristen Milum, et al. in "In Situ Heavy Metal Contaminant Removal Using Emulsified Iron," *Remediation of Chlorinated and Recalcitrant Compounds* 2004, May 2004. Battelle Press, ISBN # 1-57477-132-9 discuss various complexing agents that can be added along with nano-size metal particles into the emulsion system.

Collectively, the above references do not provide a composition of matter and in situ methodologies that safely degrade triacetone triperoxide (TATP), other organic peroxides that are "homemade" weapons of choice and nitro explosives that are becoming environmental pollutants in the soil, groundwater and other contaminated structures. There is a great need for a composition and method that provides safe and effective means for in situ degradation of explosive materials; the present state of the art does not meet this need.

Bimetals, FeNi, FePd, and MgPd, in combination with other technologies including bimetallic treatment systems (BTS) reported by K. B. Brooks et al. in *Proceedings of the International Conference on Remediation of Chlorinated and Recalcitrant Compounds*, 5$^{th}$, Monterey, Calif. (May 22-25, 2006) and emulsified zero valent metal (EZVM) discussed by J. Quinn et al. in *Environ. Sci. Technol.* 39(5) (2005) supra provide a potential in situ method for remediating TNT and RDX contamination in groundwater, soil, and structures.

SUMMARY OF THE INVENTION

A first objective of the present invention is to provide a bimetal catalyst system and field deployment of the catalyst system to remediate nitro explosive contamination.

A second objective of the present invention is to provide a bimetal catalyst system and method for in situ degradation of TNT, RDX and other nitrogen containing explosives.

A third objective of the present invention is to provide a bimetal catalyst system that is a neat metal alloy that can be applied to nitro explosive contaminated soil, groundwater and structures to degrade the nitro explosive contaminant.

A fourth objective of the present invention is to provide a neat metal alloy and method for degrading triacetone triperoxide in situ without mixing or agitation.

A preferred bimetal catalyst system useful in degrading nitrogen-containing explosives is prepared by ball-milling a first metal selected from magnesium and iron with a second metal selected from at least one of palladium and nickel to form a plurality of bimetal alloy particles that degrades an explosive compound when there is contact between the explosive compound and the plurality of bimetal alloy particles. The preferred ball-milled bimetal alloy particles are in sizes selected from at least one of nano sized and micron sized wherein the preferred micron sized bimetal alloy particles are selected from the group consisting of iron palladium (FePd), iron nickel (FeNi), and magnesium palladium (MgPd).

A more preferred bimetal catalyst system is used to degrade an explosive compound selected from the group consisting of 2,4,6-trinitrotoluene (TNT), cyclo-1,3,5-trimethylene-2,4,6-trinitramine (RDX), nitrocellulose and nitroglycerine.

A preferred method of degrading an explosive compound in situ includes, contacting an explosive compound with a bimetallic catalyst system consisting of a plurality of micron sized neat particles of a bimetallic alloy; and thereby catalyzing the degradation of the explosive compound.

The preferred plurality of neat micron sized bimetallic alloy particles is selected from the group consisting of iron palladium (FePd), iron nickel (FeNi), and magnesium palladium (MgPd). A more preferred bimetallic catalyst system further comprises bimetallic alloys of an elemental metal and a metal hydrogenation catalyst used in the degradation of an explosive compound selected from the group consisting of 2,4,6-trinitrotoluene (TNT), cyclo-1,3,5-trimethylene-2,4,6-trinitramine (RDX), nitrocellulose and nitroglycerine. The preferred bimetallic catalyst system is also useful in the degradation of an explosive compound that is a contaminant in soil, ground water and other structures.

It is also preferred that a plurality of neat micron sized metal particles in an elemental state with reductive properties be used to facilitate safe, in situ degradation of an explosive compound when there is contact between the neat metal particles and the explosive compound.

A preferred method for safely degrading a nitro explosive compound in situ includes contacting a nitro explosive compound with a plurality of neat bimetallic alloy particles prepared by ball-milling a first metal selected from magnesium and iron with a second metal selected from at least one of palladium and nickel.

It is preferred that the plurality of ball-milled bimetal alloy particles be prepared in sizes selected from at least one of nano size and micron size, wherein the nano size particles are in the range of from approximately 40 nanometers to approximately 100 nanometers in diameter and the micron size particles are in the range of from approximately 1 micrometer to approximately 10 micrometers in diameter.

It is most preferred that the plurality of bimetal alloy particles are selected from the group consisting of iron palladium (FePd), iron nickel (FeNi), and magnesium palladium (MgPd) and the explosive compound to be degraded is selected from the group consisting of 2,4,6-trinitrotoluene (TNT), cyclo-1,3,5-trimethylene-2,4,6-trinitramine (RDX), nitrocellulose and nitroglycerine, most preferably, the explosive compound to be degraded is cyclo-1,3,5-trimethylene-2,4,6-trinitramine (RDX).

The degradation activity of the preferred plurality of bimetal particles is of an order wherein magnesium palladium (MgPd) is greater than iron nickel (FeNi), which is greater than iron palladium (FePd) and the explosive compound to be degraded is 2,4,6-trinitrotoluene (TNT).

The degradation activity of another preferred plurality of bimetal particles is of an order wherein iron palladium (FePd) is greater than magnesium palladium (MgPd) which is greater than iron nickel (FeNi) and the explosive compound is a contaminant in soil, ground water, natural structures and manmade structures.

Further objects and advantages of this invention will be apparent from the following detailed description of a presently preferred embodiment, which is illustrated in the accompanying figures.

DESCRIPTION OF THE PREFERRED EMBODIMENT

Figure 1A:
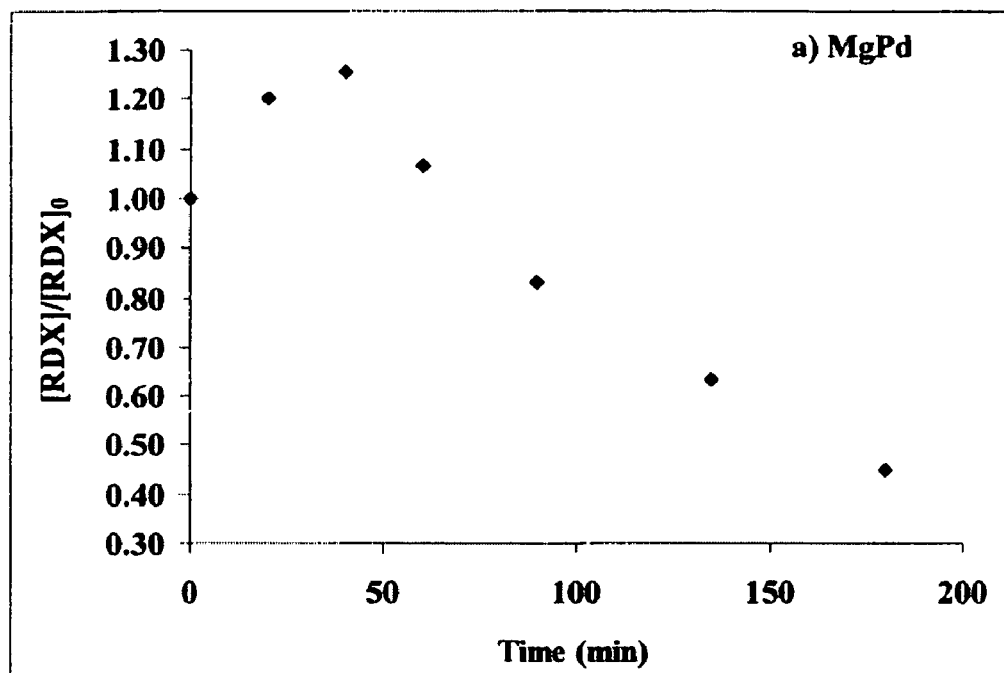
FIG. 1A is a pseudo-first order kinetic degradation plot of cyclo-1,3,5-trimethylene-2,4,6-trinitramine (RDX) in water using magnesium palladium (MgPd) alloy.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words and acronyms used herein and their application before discussing the composition of matter and method of using and making the same.

"Acetone peroxide" is a generic term for the family of explosive peroxides consisting of both dimer and trimer forms.

Ball milling is a process used in mechanical alloying in which ball mills are used for grinding and for cold welding with the purpose of producing alloys from powders.

Bimetal alloy refers to a composition that includes two metals joined together and in the present invention, the two metals are joined together in a ball milling process.

DADP is diacetone diperoxide the dimeric form of acetone peroxide.

EZVM means emulsified zero valent metal.

"Nitro explosives" is a generic term for the family of nitrogen-based compounds, including TNT, RDX, nitrocellulose and nitroglycerine.

RDX means cyclo-4,3,5-trimethylene-2,4,6-trinitramine

TATP means triacetone triperoxide the trimeric form of acetone peroxide and the form commonly used as a "homemade" explosive.

TNT means 2,4,6-trinitrotoluene

ZVI means zero valent iron

For purposes of discussion, three specific bimetals or metallic alloys are prepared and tested in the degradation of peroxide and nitro explosives, and it is understood that the invention is not limited to the degradation of named explosives and should include the known family of nitro and peroxide explosives. The parent application Ser. No. 11/732,402, entitled, "Safe In-Situ Methodologies for the Destruction of Triacetone Triperoxide and other Explosive Peroxides," teaches and claims the degradation of peroxide explosives while, this current continuation-in-part application is directed to the degradation of nitro explosives.

It has been discovered that micron sized bimetal particles, either neat or encapsulated in an emulsion, can degrade 2,4,6-trinitrotoluene (TNT) and cyclo-1,3,5-trimethylene-2,4,6-trinitramine (RDX) to remediate contaminated groundwater, soil, and structures.

Several different metal particle systems disclosed herein include, pure iron (both nano and micron sizes), pure micron size magnesium particles, iron and magnesium particles that have been activated by ball milling palladium to their surface, and iron and magnesium particles that have been activated by ball milling nickel to the surface of the particles. In general, the bimetal particles that contain palladium or nickel have higher rates of degradation than the pure iron particles.

EXAMPLE 1

BiMetal Alloy Preparation

The metals used included microscale iron (Fe), 1-3 μm diameter, obtained from BASF (Iselin, N.J.); microscale magnesium (Mg), 2-4 μm diameter, from Hart Metals, Inc. (Tamaqua, Pa.); 1% palladium (Pd) on carbon from Engelhard (Iselin, N.J.); 75% Nickel (Ni) on graphite (<75 μm) from Alfa Aesar (Ward Hill, Mass.). MgPd, FeNi, and FePd were prepared by ball-milling 78 g of Mg or Fe and 7 g of the respective bimetal, which was developed in-house according to Aitken et al., "Remediaton of Chlorinated and Recalcitrant Compounds," *Proceedings of the International Conference on Remediation of Chlorinated and Recalcitrant Compounds.* 5$^{th}$, Monterey, Calif. May 22-25, 2006.

EXAMPLE 2

RDX Neat Metal Studies and Analysis

Cyclo-1,3,5-trimethylene-2,4,6-trinitramine (RDX) (5000 μg/mL) standard solutions in acetonitrile were obtained from Restek Corporation (Bellefonte, Pa.). These standard solutions were diluted in deionized water. Vial studies were performed in duplicate, in ambient temperature and pressure, and under normal aerobic conditions. Five mL samples of the appropriate aqueous explosive sample were exposed to 0.25 g of the appropriate metal in 12 mL glass amber vials that were continuously shaken using a reciprocating shaker. Samples were extracted using 5 mL toluene (optima grade) and shaken by hand for 2 minutes followed by an ultrasonic bath for 5 minutes. The toluene layer was filtered using Puradisc™ 25 mm diameter 0.45 μm pore size syringe filter attached to a glass syringe.

Samples were analyzed on a Perkin Elmer AutoSystem gas chromatograph equipped with an electron capture detector (GC-ECD). A Rtx-5 column (30 m, 0.25 mm i.d., 0.25 μm df) was used. The ECD makeup gas was ultra high purity nitrogen at 30 ml/min, and helium was used as carrier gas with a constant pressure of 40 psi for the analysis of RDX. The injector temperature was 180° C. and the detector temperature was 325° C. For RDX analysis, the oven was programmed at an initial temperature of 50° C. held for 1 minute, ramped at 20° C./min. until reaching a final temperature of 300° C. where it is held for 3 minutes. A Thermo Finnagin Trace gas chromatograph DSQ mass spectrometer (GC-MS)

was used for byproduct detection. The column, oven temperature program, carrier gas, and injector port were the equivalent to the GC-ECD conditions. The GC-MS transfer line and the source were both at 200° C.

EXAMPLE 3

TNT Neat Metal Studies and Analysis

Trinitrotoluene (TNT) (5000 µg/mL) standard solutions in acetonitrile were obtained from Restek Corporation (Bellefonte, Pa.) and the same conditions were used for processing as stated in Example 2 above.

Samples were analyzed on a Perkin Elmer AutoSystem gas chromatograph equipped with an electron capture detector (GC-ECD). A Rtx-5 column (30 m, 0.25 mm i.d., 0.25 µm df) was used. The ECD makeup gas was ultra high purity nitrogen at 30 mL/min, and helium was used as carrier gas with a constant pressure of 20 psi for the analysis of TNT. The injector temperature was 180° C. and the detector temperature was 325° C. For TNT analysis, the oven was programmed at an initial temperature of 50° C., held 1 minute, ramped at 8° C./minute until reaching 250° C. and was held 3 minutes. A Thermo Finnagin Trace gas chromatograph DSQ mass spectrometer (GC-MS) was used for byproduct detection. The column, oven temperature program, carrier gas, and injector port were the equivalent to the GC-ECD conditions. The GC-MS transfer line and the source were both at 200° C.

EXAMPLE 4

TATP Neat Metal Studies, EZVM Studies, and Analysis

Triacetone triperoxide (TATP) was prepared in the laboratory using acetone, hydrogen peroxide, and sulfuric acid according to previously published procedures using appropriate safety measures reported by Milas and Golubovic, in *J. Am. Chem. Soc.* 82, 1959 supra. The prepared TATP crystals were dissolved appropriately in a 1:4 methanol:deionized water. Neat metal studies were performed using 0.25 g MgPd in 20 mL vials and 5 mL of the TATP methanol/water solution. Samples were syringe filtered (Puradisc™) to remove the metal from solution, extracted using 5 mL of toluene, hand-shaken for 1 minute and centrifuged for 2 min. The top organic layer was removed and analyzed using a Perkin Elmer AutosystemXL equipped with a flame ionization detector (GC-FID). A DB-624 column (30 m, 0.53 mm i.d., 3 µm df) was used, and helium was used as the carrier gas with a flow of 5 mL/min. The injector temperature was 180° C. and the detector temperature was 250° C. The oven was held at an initial temperature of 50° C. for 5 minutes, ramped at 10° C./minute to 200° C. and then held for 2 minutes. Acetone standards were analyzed using this method. EZVM was prepared as described in Quinn et al. *Environ. Sci. and Tech.* 39, 2005 supra, using MgPd. Five grams of EZVM was added to water containing TATP. TATP concentrations were analyzed through a 1 minute direct extraction using a 7 µm PDMS solid phase micro extraction fiber (SPME) and 3 minute desorption in GC-FID injector port.

RDX Degradation is Shown by RDX Neat Metal Kinetic Studies

The kinetic plots of the RDX degradation in FIG. 1 demonstrate pseudo-first-order rate law. This observation agrees with experimental data using comparable metals with nitro explosives, reported by Bandstra et al. *Environ. Sci. Technol.* 39 2005 supra; Fuller et al., *Chemosphere* 67 2007 supra; Kim et al., *Environ. Sci. Technol.* 41, 2007 supra. The pseudo first order rate law of RDX degradation is shown below $$\frac{d[RDX]}{dt} = -k_{RDX}[RDX]$$

Figure 1B:
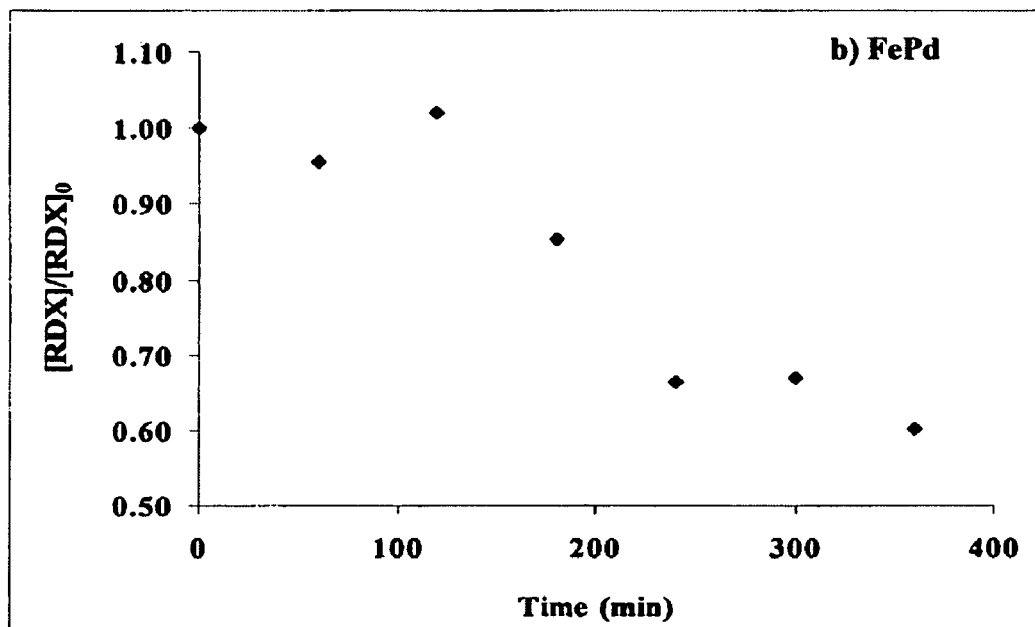
FIG. 1B is a pseudo-first order kinetic degradation plot of cyclo-1,3,5-trimethylene-2,4,6-trinitramine (RDX) in water using iron palladium (FePd) alloy.

A lag-period was observed for the first 100 minutes after exposing the RDX to FePd and within the initial 45 minutes in the MgPd studies with RDX as seen in FIGS. 1a and 1b. This lag-period may be explained by the adsorption of the hydrogen to the catalyst's surface. The adsorption of hydrogen is necessary for the reduction reaction. These lag-periods were not used when calculating the pseudo-first order rate constants for the MgPd and FePd studies.

The rate constants ($k_{RDX}$) for all the metals are determined using the following first-order kinetic equation:

$$\frac{[RDX]}{[RDX]0} = e^{-k_{RDX}t}$$

The rate constants for RDX degradation are found in Table 1 below.

TABLE 1

| | Normalized pseudo-first-order rate constants ($k_{RDX}$) of RDX degradation in $H_2O$ | |
|---|---|---|
| Metal | Normalized Rate Constant ($k_{RDX}$) (L g$^{-1}$ min$^{-1}$) | Coefficient of Determination ($R^2$) |
| Fe | NDO* | NA |
| MgPd | $1.5 \times 10^{-4}$ | 0.99 |
| FePd | $4.4 \times 10^{-5}$ | 0.97 |
| FeNi | $3.2 \times 10^{-5}$ | 0.90 |

(*NDO = No degradation observed)

Figure 1C:
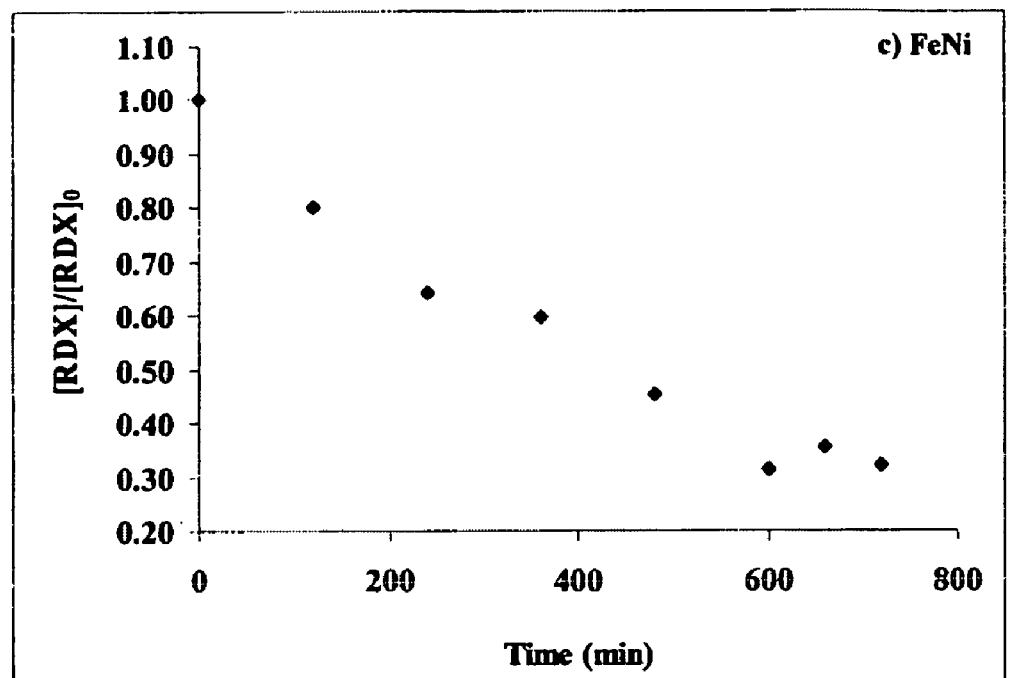
FIG. 1C is a pseudo-first order kinetic degradation plot of cyclo-1,3,5-trimethylene-2,4,6-trinitramine (RDX) in water using iron nickel (FeNi) alloy.
Figure 1D:
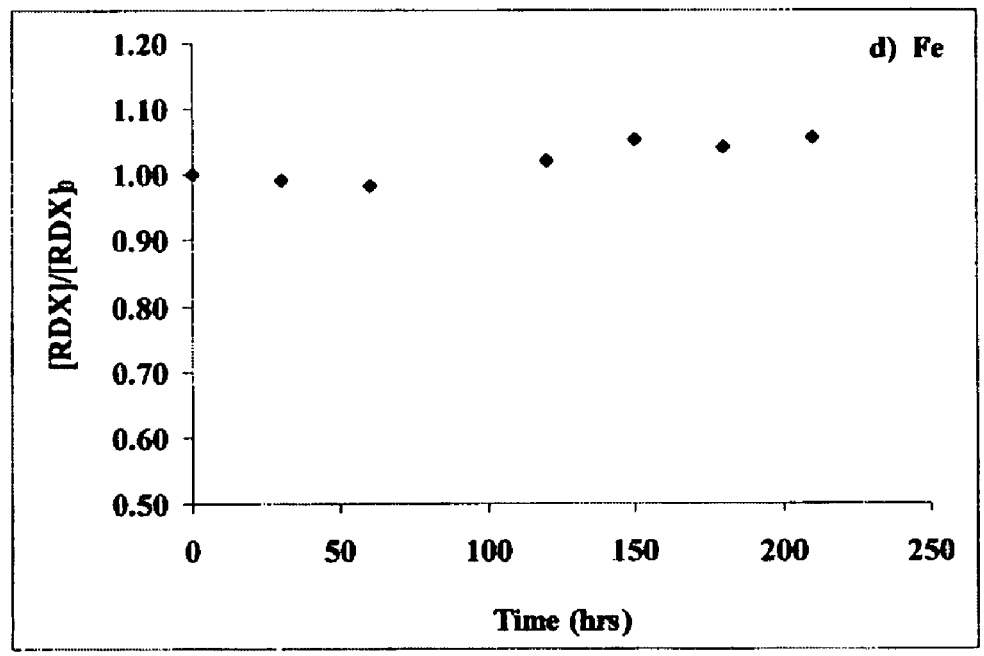
FIG. 1D is a pseudo-first order kinetic degradation plot of cyclo-1,3,5-trimethylene-2,4,6-trinitramine (RDX) in water using iron (Fe) particles.

The data from each metal study with RDX was fit to the previous first-order rate kinetic equation above and the exponential fit had coefficients of determination at 0.99, 0.97, and 0.90 for MgPd, FePd, and FeNi, respectively. The rate constants were normalized to the metal concentration ($p_m$=50 g L$^{-1}$) used in the vial studies. The zero-order kinetic plots of RDX in water demonstrate RDX is degraded by MgPd, as shown in FIG. 1A; FePd, as shown in FIG. 1B and FeNi, as shown in FIG. 1C as compared to that of micro-scale Fe. In FIG. 1D, the micro-scale Fe showed no degradation after 9 days in ambient conditions. No cyclic byproducts were identified in analyzing for RDX with the GC-ECD, which may suggest the cleavage of the RDX ring. The identity the final byproducts of the RDX degradation remains a concern.

TNT Degradation is shown using TNT Neat Metal Kinetic Studies. The kinetic data for the degradation of TNT is found in FIGS. 2A-2D. Similar to RDX degradation, the kinetics of the TNT disappearance also displayed a pseudo-first order rate law:

$$\frac{d[TNT]}{dt} = -k_{TNT}[TNT]$$

The rate constant ($k_{TNT}$) was determined using the following first-order kinetic equation:

$$\frac{[TNT]}{[TNT]0} = e^{-k_{TNT}t}$$

Figure 2A:
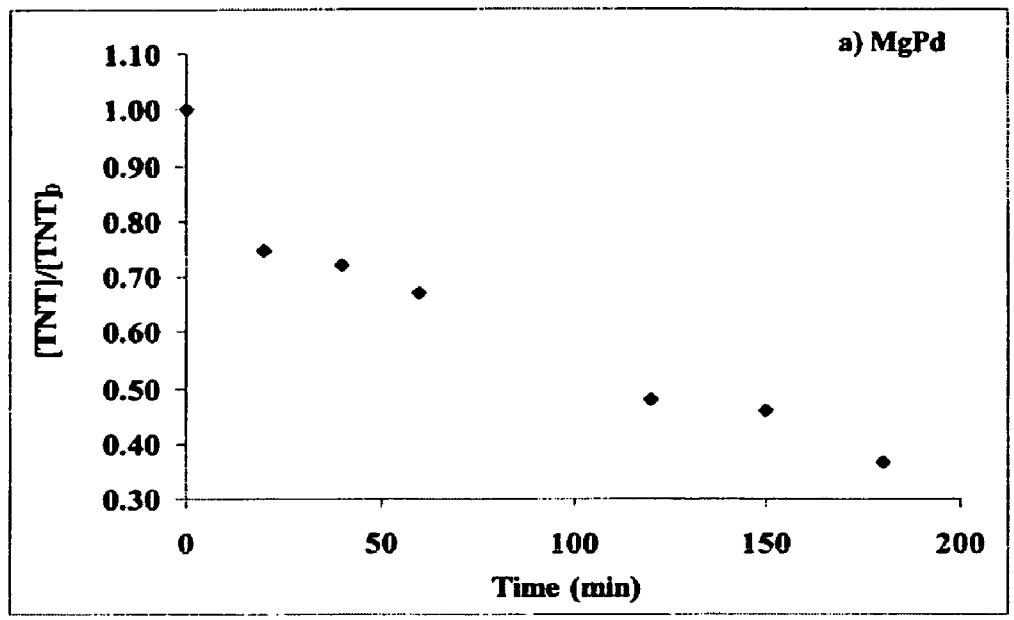
FIG. 2A is a pseudo-first order kinetic degradation plot of 2,4,6-trinitrotoluene (TNT) in water using magnesium palladium (MgPd) alloy.
Figure 2B:
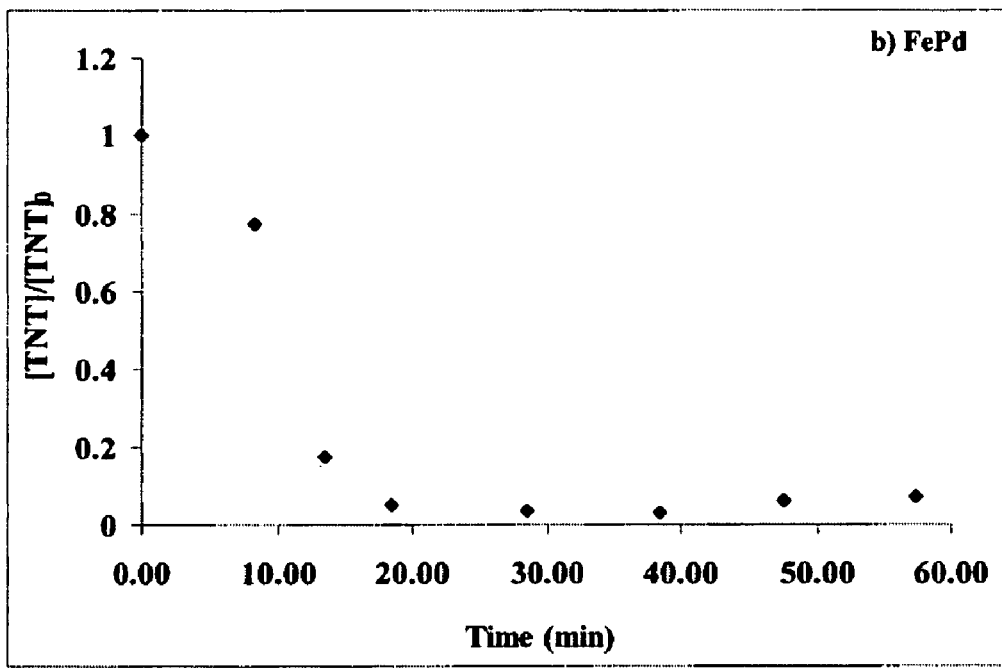
FIG. 2B is a pseudo-first order kinetic degradation plot of 2,4,6-trinitrotoluene (TNT) in water using iron palladium (FePd) alloy.

As seen in FIG. 2B, the degradation of TNT with FePd occurred rapidly; consequently, the rate constant of the degradation of TNT with FePd was only calculated during the initial drop (first 20 minutes) of TNT concentration. The normalized rate constants for the degradation of TNT are calculated using the above equation and shown in Table 2 below.

TABLE 2

Normalized pseudo-first-order rate constants ($k_{TNT}$) of TNT degradation in water

| Metal | Normalized Rate Constant ($k_{TNT}$) (L g$^{-1}$ min$^{-1}$) | Coefficient of Determination (R$^2$) |
|---|---|---|
| Fe | NDO* | NA |
| MgPd | 5.6 × 10$^{-4}$ | 0.96 |
| FePd | 5.0 × 10$^{-3}$ | 0.99 |
| FeNi | 2.7 × 10$^{-4}$ | 0.84 |

(*NDO = No degradation observed)

The rate constants calculated from the pseudo-first order equation are normalized with the metal concentration ($\rho_m$=50 g L$^{-1}$).

Figure 2C:
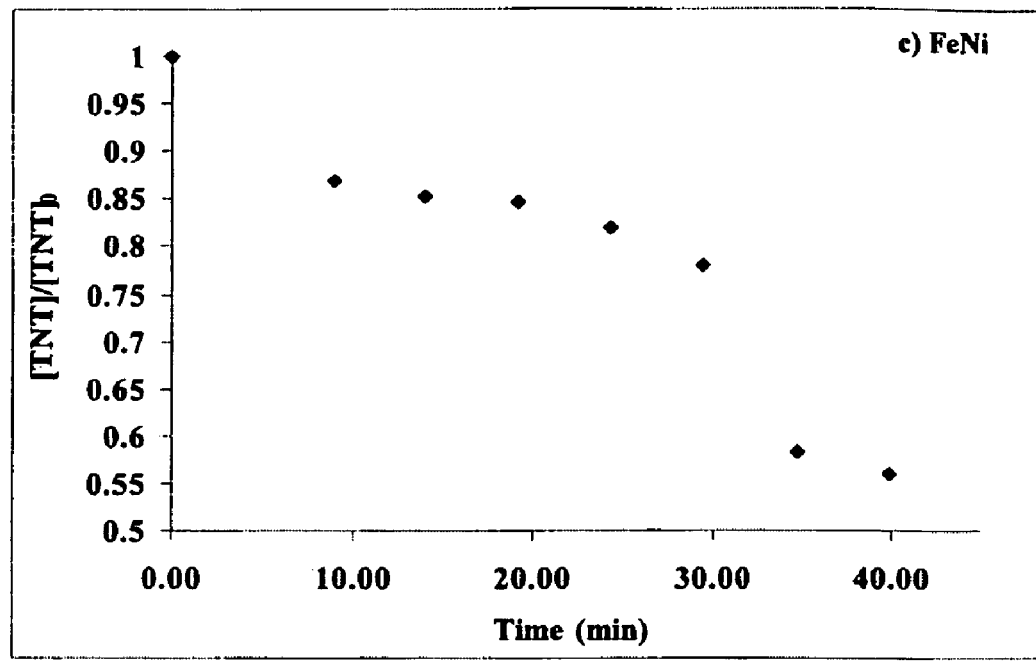
FIG. 2C is a pseudo-first order kinetic degradation plot of 2,4,6-trinitrotoluene (TNT) in water using iron nickel (FeNi) alloy.
Figure 2D:
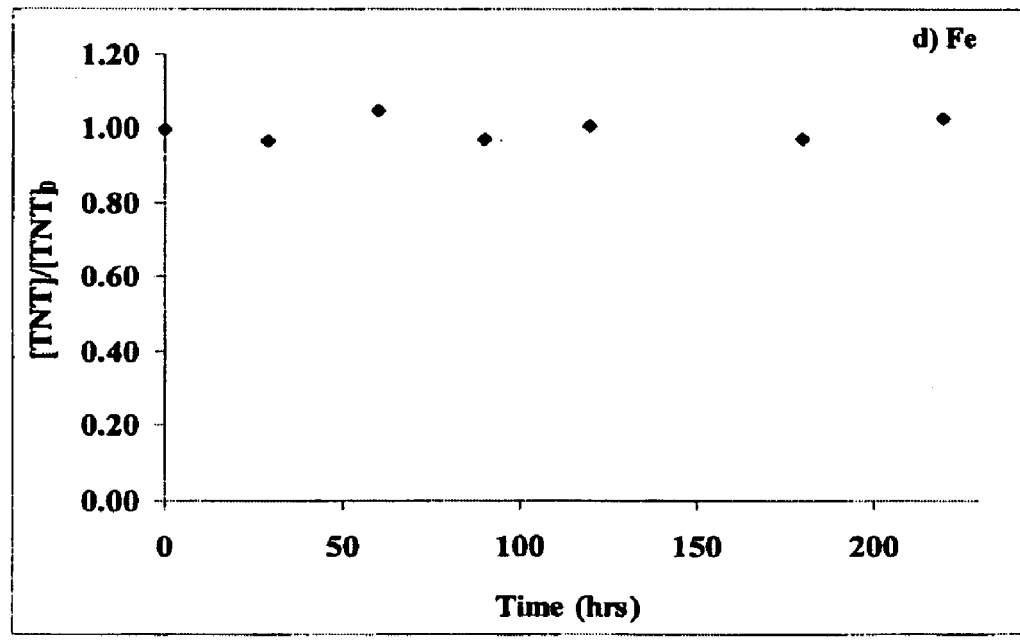
FIG. 2D is a pseudo-first order kinetic degradation plot of 2,4,6-trinitrotoluene (TNT) in water using iron (Fe) particles.

As observed, TNT is degraded by all three bimetals, MgPd (FIG. 2A), FePd (FIG. 2B) and FeNi (FIG. 2C). Similar to RDX, TNT was not degraded in the presence of the microscale iron at ambient conditions, as shown in FIG. 2D. Initial work was completed to identify the byproducts of TNT degradation with MgPd. GC-MS was used to identify 2,4-dinitrotoluene and 4-amino-2,6-dinitrotoluene as byproducts. These byproducts were observed to increase then diminish, with MgPd expected to have degraded these byproducts in addition to TNT. The final byproducts of all these reactions continue to be explored.

Figure 3:
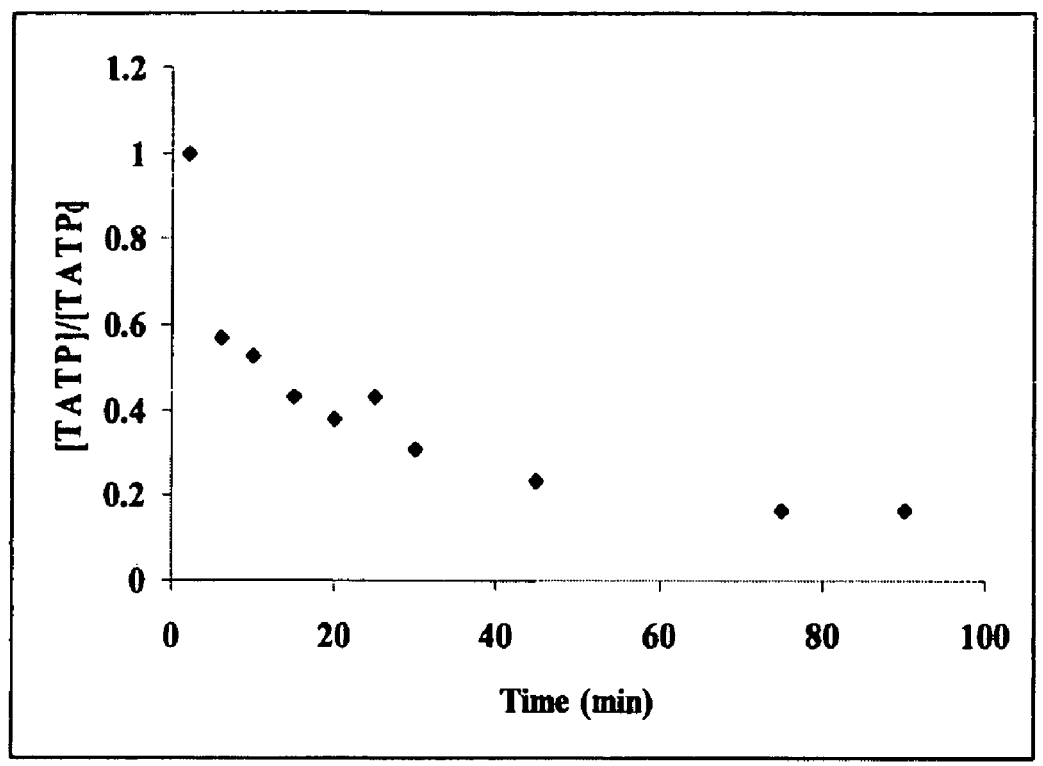
FIG. 3 is a pseudo-first order kinetic degradation plot of triacetone triperoxide (TATP) in 4:1 water:methanol solution.

TATP Degradation is shown using TATP Neat Metal and EZVM Kinetic Studies. TATP was degraded by MgPd as seen by the kinetic data shown in FIG. 3. The kinetics of the TATP disappearance has also followed a pseudo-first order rate law:

$$\frac{d[TATP]}{dt} = -k_{TATP}[TATP]$$

The rate constant ($k_{TATP}$) is determined using the following first-order kinetic equation:

$$\frac{[TATP]}{[TATP]_0} = e^{-k_{TATP}t}$$

The rate constant listed in Table 3 below was calculated by fitting the pseudo first-order kinetic equation to the degradation data, and the rate constant was normalized to the metal concentration ($\rho_m$=50 g L$^{-1}$).

TABLE 3

Normalized pseudo-first-order rate constant ($k_{TATP}$) of TATP degradation in 4:1 water:methanol solution

| Metal | Normalized Rate Constant ($k_{TATP}$) (L g$^{-1}$ min$^{-1}$) | Coefficient of Determination (R$^2$) |
|---|---|---|
| MgPd | 7.3 × 10$^{-4}$ | 0.94 |

An initial drop in TATP concentration was observed followed by a gradual rate of TATP degradation thus this first point was not used in calculating the rate constant of TATP degradation.

Figure 4:
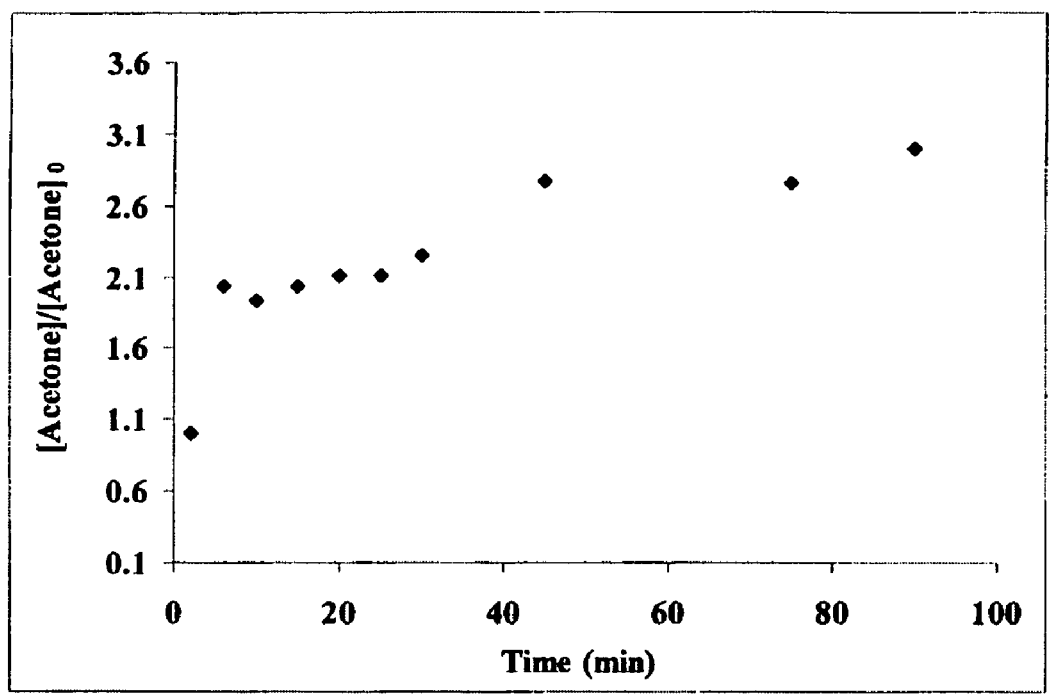
FIG. 4 is a pseudo-first order kinetic plot of acetone production from triacetone triperoxide (TATP) in 4:1 water:methanol solution.

Acetone was observed as the major byproduct of the degradation of TATP with MgPd, the production of acetone is shown in FIG. 4, and two moles of acetone were measured for every one mole of TATP degraded. Lower molecular weight gases ($CO_2$, $O_3$, ethane, and ethene) are continued to be explored as the additional byproducts.

Figure 5:
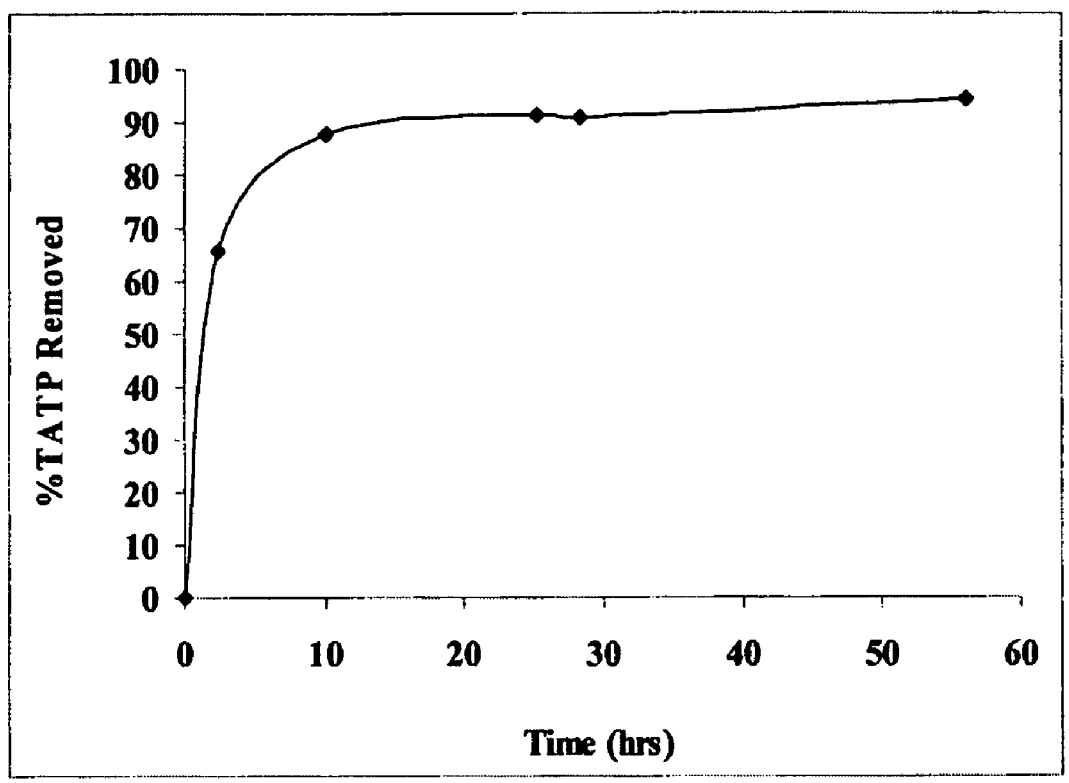
FIG. 5 is triacetone triperoxide (TATP) removed from water using emulsified zero valent metal (EVZM).

The absorption and degradation of TATP using EZVM was also explored. An aqueous solution containing TATP was treated with EZVM containing MgPd to determine if EZVM is able to absorb and degrade TATP from aqueous solutions. The headspace above the aqueous layer was monitored using SPME. The results from this vial study are shown in FIG. 5. The EZVM absorbed 96.5% of the TATP within 55 hours where it will be degraded within the inner aqueous layer of the emulsion.

Table 4 lists the key component in bimetal catalyst systems, a reactive metal particle in nano or micron size. The nano-size particles are in the range of from approximately 40 nanometers to approximately 100 nanometers (nm) in diameter; the micron-size particles are in the range of from approximately 1 micrometer to approximately 10 micrometers (μm) in diameter.

TABLE 4

Bimetals Used to Degrade Nitro and Peroxide Explosives

| REACTIVE METALS | Nano-size | Micron-size |
|---|---|---|
| Iron Palladium alloy (FePd) | 40-100 nm | 1-10 μm |
| Iron Nickel alloy (FeNi) | 20-100 nm | 1-3 μm |
| Magnesium Palladium alloy (MgPd) | — | 1-3 μm |

The metal particles identified in Table 4 are suitable for use as neat particles or encapsulated in an emulsion to form a reactive system that can effectively and rapidly degrade TATP, TNT and RDX and other explosives in a safe, controlled manner.

All three bimetals, FePd, FeNi, and MgPd, were successful in degrading the explosives RDX and TNT. Untreated microscale ZVI showed no degradation at ambient temperatures and anaerobic conditions. The bimetals show a varying degree of activity between the two explosives. For RDX degradation, the activity of the metal is observed as MgPd>FeNi>FePd. The metal activity with TNT is observed as FePd>MgPd>FeNi. This difference in activity may be due to an alternative reaction pathway. These observations and theories require future investigation to determine the reason for differences in activity.

The final byproducts of the degradation of these explosives are very significant in the ability of bimetals to be used in field applications. Byproducts, such as TAT, have been recognized as the major byproduct of the reaction with TNT and ZVI under inert environments as discussed by Bandstra et al in

*Environ. Sci. Technol.* 39, 2006 supra. TAT, however, is more hazardous than the TNT contamination aiming to be degraded. No TAT is observed in the degradation studies, and other work with Ni catalysts has produced byproducts that did not include TAT according to Fuller et al., *Chemosphere* 67 2007 supra, which appears promising for future use of these bimetals for field application. The tested bimetals may lead them to proceed in a different reductive pathway than that of ZVI due to the nature of the bimetals themselves, which could produce more reduced byproducts than those byproducts produced by ZVI. It is important to determine the byproducts of these reactions to validate the appropriateness of field application and avoid the creation of lethal or toxic byproducts during remediation.

TATP was also degraded using the bimetal, MgPd. The major byproduct of that reaction was acetone. The MgPd EZVM was also successful in absorbing TATP from the aqueous solution. EZVM also has been observed to absorb TATP crystals. Incorporating the MgPd with the EZVM delivery technology provides a promising in situ method for treating wet and dry crystals of TATP.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for safely degrading a nitro explosive compound in situ, comprising the steps of: contacting a nitro explosive compound with a plurality of neat bimetallic alloy particles in sizes selected from at least one of nano size and micron size, wherein the neat bimetallic alloy particles are prepared b, ball-milling a first metal selected from magnesium and iron with a second metal selected from at least one of palladium and nickel.

2. The method of claim 1, wherein the nano size particles are in the range of from approximately 40 nanometers to approximately 100 nanometers in diameter and the micron size particles are in the range of from approximately 1 micrometer to approximately 10 micrometers in diameter.

3. The method of claim 1, wherein the plurality of bimetal alloy particles are selected from the group consisting of iron palladium (FePd), iron nickel (FeNi), and magnesium palladium (MgPd).

4. The method of claim 1, wherein the explosive compound is selected from the group consisting of 2,4,6-trinitrotoluene (TNT), cyclo-1,3,5-trimethylene-2,4,6-trinitramine (RDX), nitrocellulose and nitroglycerine.

5. The method of claim 4, wherein the explosive compound to be degraded is cyclo-1,3,5-trimethylene-2,4,6-trinitramine (RDX).

6. The method of claim 5, wherein the degradation activity of the plurality of bimetal particles is of an order wherein magnesium palladium (MgPd) is greater than iron nickel (FeNi), which is greater than iron palladium (FePd).

7. The method of claim 4, wherein the explosive compound to be degraded is 2,4,6-trinitrotoluene (TNT).

8. The method of claim 7, wherein the degradation activity of the plurality of bimetal particles is of an order wherein iron palladium (FePd) is greater than magnesium palladium (MgPd) which is greater than iron nickel (FeNi).

9. The method of claim 1, wherein the explosive compound is a contaminant in soil, ground water, natural structures and manmade structures.

\* \* \* \* \*